United States Patent
Öttinger et al.

(10) Patent No.: US 6,596,369 B2
(45) Date of Patent: Jul. 22, 2003

(54) FLAT SEMI-FINISHED PRODUCT, COMPONENT MADE THEREFROM AND PROCESS FOR THE PRODUCTION THEREOF

(75) Inventors: Oswin Öttinger, Meitingen (DE); Manfred Jung, Ellgau (DE); Silvia Mechen, Meitingen (DE)

(73) Assignee: SGL Carbon AG, Meitingen (DE)

( * ) Notice: Subject to any disclaimer, the term of this patent is extended or adjusted under 35 U.S.C. 154(b) by 7 days.

(21) Appl. No.: 09/838,751

(22) Filed: Apr. 19, 2001

(65) Prior Publication Data

US 2002/0018888 A1 Feb. 14, 2002

(30) Foreign Application Priority Data

Apr. 19, 2000 (DE) .......................................... 100 19 678

(51) Int. Cl.[7] .......................... B32B 27/08; B32B 27/20; B32B 27/30; B32B 31/26
(52) U.S. Cl. ....................... 428/66.4; 428/195; 428/217; 428/336; 428/421; 428/422; 264/85; 264/127; 264/132; 264/157; 427/282; 427/358; 427/375; 427/385.5; 427/421; 427/430.1
(58) Field of Search ............................. 428/36.91, 64.1, 428/141, 195, 421, 422, 336, 217, 66.4; 264/85, 132, 127, 157; 427/430.1, 421, 358, 282, 375, 385.5

(56) References Cited

U.S. PATENT DOCUMENTS

| 4,900,629 A | | 2/1990 | Pitolaj ........................ 428/422 |
| 4,961,891 A | | 10/1990 | Pitolaj ........................ 264/113 |
| 5,286,568 A | * | 2/1994 | Bacino et al. ........... 428/318.6 |
| 5,832,346 A | * | 11/1998 | Lewis ........................ 361/225 |

FOREIGN PATENT DOCUMENTS

| DE | 36 38 701 A1 | 5/1988 |
| DE | 36 38 703 A1 | 5/1988 |
| DE | 36 42 509 C2 | 6/1988 |
| DE | 43 42 823 A1 | 6/1994 |
| DE | 196 54 102 A1 | 6/1998 |
| DE | 197 53 131 A1 | 6/1999 |
| EP | 0 268 233 A1 | 5/1988 |
| EP | 0268 958 A1 | 6/1988 |
| EP | 0 365 871 B1 | 5/1990 |

* cited by examiner

*Primary Examiner*—Ramsey Zacharia
(74) *Attorney, Agent, or Firm*—Laurence A. Greenberg; Werner H. Stemer; Ralph E. Locher

(57) ABSTRACT

A flat semi-finished product includes a filled fluoroplastics substrate in the form of a sheet, which is coated at least partially on at least one surface with a soft, thin coating of fluoroplastics. The substrate material of the sheet has a Shore-D hardness of at least 65 and the average layer thickness of the thin sheet coating is at most 20 μm. A component, in particular a flat gasket, is made from the semi-finished product. A process for the production thereof is also provided.

33 Claims, 2 Drawing Sheets

FLAT SEMI-FINISHED PRODUCT, COMPONENT MADE THEREFROM AND PROCESS FOR THE PRODUCTION THEREOF

BACKGROUND OF THE INVENTION

FIELD OF THE INVENTION

The invention relates to a flat semi-finished product including a coated sheet. The sheet is formed of a fluoroplastics substrate containing fillers and the coating is formed of fluoroplastics. The coating is soft and thin in comparison with the sheet and the coating at least partially covers the surface of the sheet. The invention also relates to a process for producing a flat semi-finished fluoroplastics product, in which a polytetrafluoroethylene powder is mixed with a reinforcing phase to yield a powder composition, the powder composition is cold-pressed to yield a hollow cylinder, the hollow cylinder is sintered and at least one sheet is shaved or peeled from the hollow cylinder. The invention additionally relates to a finished component, in particular a flat gasket, made from the semi-finished product.

Flat gaskets of fluoroplastics generally exhibit better impermeability than fiber gaskets bound with other polymers and better impermeability than graphite gaskets. However, a disadvantage of fluoroplastics gaskets is their relatively low compression stability or the very pronounced set or creep tendency of flat gaskets of fluoroplastics. For that reason, in the case of a flat gasket held between two flanges clamped relative to one another, the surface pressure acting thereon diminishes over time. That results in undesirable leakages, in particular at elevated temperatures.

In the past, in order to reduce creep in fluoroplastics gasket materials, fluoroplastics compositions were used which were filled with inorganic substances such as, for example, glass fibers, quartz, silicon carbide or barium sulfate. Although that did make the gasket material more creep stable and compression resistant, the conformability thereof to the flange surfaces, which may be somewhat rough after machining, was reduced, in such a way that pronounced surface leakage channels were able to form between gasket and flange.

In order to counter that problem, multilayer fluoroplastics composites that are known, for example, from U.S. Pat. No. 4,961,891 were developed, with a sheet being formed of filled fluoroplastics substrate. That sheet has a comparatively thick, soft coating of fluoroplastics on each side. Such multilayer composites exhibit a low short-term leakage rate at low to medium surface pressures due to the good deformation capacity of the soft outer coating and the consequently good conformability to surface roughness.

However, it has surprisingly now emerged that such multilayer composites exhibit similarly low creep stability relative to the gaskets of unfilled or slightly filled fluoroplastics mentioned above, when considered over a relatively longer period. The reason therefor is that the soft outer coatings are too thick. As compared to the known setting processes, the relatively thick coating acts as a lubricating film, which causes the gasket to slide to an unexpectedly high degree relative to the flange surface, thus leading to a loss in prestressing. Accordingly, the tightness of such sealing connections diminishes over time.

SUMMARY OF THE INVENTION

It is accordingly an object of the invention to provide a flat semi-finished product and a component of the above-mentioned type made therefrom, in particular a flat gasket, which is distinguished, when used in a sealing connection, by a high level of impermeability and at the same time by high creep resistance, as well as a cost-effective process for producing such a semi-finished product, which overcome the hereinafore-mentioned disadvantages of the heretofore-known products and processes of this general type.

With the foregoing and other objects in view there is provided, in accordance with the invention, a flat semi-finished product, comprising a sheet having a surface. The sheet is formed of a fluoroplastics substrate containing fillers and is formed of a material having a Shore-D hardness of at least 65. A coating disposed on the sheet is formed of fluoroplastics. The coating is softer and thinner than the sheet, it at least partially covers the surface of the sheet and it has an average layer thickness of at most 20 $\mu$m.

An advantage of the semi-finished product according to the invention, as described in the previous paragraph, is that, due to the relatively thin top coat, form-locking meshing on a microscopic scale is possible between the surfaces of the component (gasket) punched from the sheet and the surface of a structural element prestressed in relation thereto, for example a flange surface, so that flow is prevented. A form-locking connection is one which connects two elements together due to the shape of the elements themselves, as opposed to a force-locking connection, which locks the elements together by force external to the elements. Creep tendencies are effectively countered by the thin soft coating combined with the relatively hard sheet, in such a way that the compression stability of gaskets that are made, for example, from the semi-finished product according to the invention is significantly improved in comparison with the prior art. At 20 $\mu$m at most, the average layer thickness lies in the lower range of conventional flange roughness levels, in such a way that, on one hand, leakage channels caused by surface roughness may be sealed even at low prestressing levels and, on the other hand, the advantageous meshing of the surfaces may occur.

In accordance with another feature of the invention, the thin coating is perforated in places, and only part of the surface of the sheet is covered thereby, preferably 50% to approaching 100%. For example, the coating may be screen-printed on in grid-form or lattice-form, in such a way that coated portions of the sheet preferably take the form of lattice lines extending perpendicularly to one another. The lines completely surround uncoated portions of the sheet surface, thereby preventing the occurrence of continuous leakage channels. This has the advantage of providing no hindrance to the uncoated portions of the sheet surface meshing form-lockingly with the associated surfaces. Such direct meshing hinders creep of the pretensioned gasket considerably.

With the objects of the invention in view, there is also provided a process for producing a flat semi-finished fluoroplastics product, which comprises mixing a polytetrafluoroethylene powder with a reinforcing phase to yield a powder composition; cold-pressing the powder composition to yield a hollow cylinder; sintering the hollow cylinder under an inert gas atmosphere, preferably under a nitrogen atmosphere; and shaving at least one sheet from the hollow cylinder. A polytetrafluoroethylene dispersion is applied to at least one surface of the sheet by dipping, spraying, knife application, atomizing or printing, especially screen printing, to provide the sheet with a thin polytetrafluoroethylene dispersion coating having an average layer thickness of at most 20 $\mu$m, preferably 2 $\mu$m to 8 $\mu$m.

It is important that the sheet exhibit a high level of hardness for the semi-finished product and a gasket made therefrom in order to function according to the invention. When producing the semi-finished products according to the process set forth in the previous paragraph, a high level of hardness is achieved in that the hollow cylinder, from which the sheets are produced by shaving or peeling, is sintered under an inert gas atmosphere, preferably under nitrogen. Furthermore, a relatively long sintering period at the final sintering temperature is also favorable for achieving high sheet hardness.

In accordance with another mode of the invention, the thin coating is applied by surface finishing methods, in particular screen printing, in such a way that the sheet has a thin polytetrafluoroethylene dispersion coating with an average layer thickness of at most 20 μm, preferably 2 μm to 8 μm.

In accordance with a concomitant mode of the invention, the average layer thickness of the film-type or grid-type polytetrafluoroethylene dispersion coating is adjusted as a function of the mesh size of the screen used during screen printing. This enables simple, cost-effective manufacture with high repeat accuracy.

Other features which are considered as characteristic for the invention are set forth in the appended claims.

Although the invention is illustrated and described herein as embodied in a flat semi-finished product, a component made therefrom and a process for the production thereof, it is nevertheless not intended to be limited to the details shown, since various modifications and structural changes may be made therein without departing from the spirit of the invention as well as within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
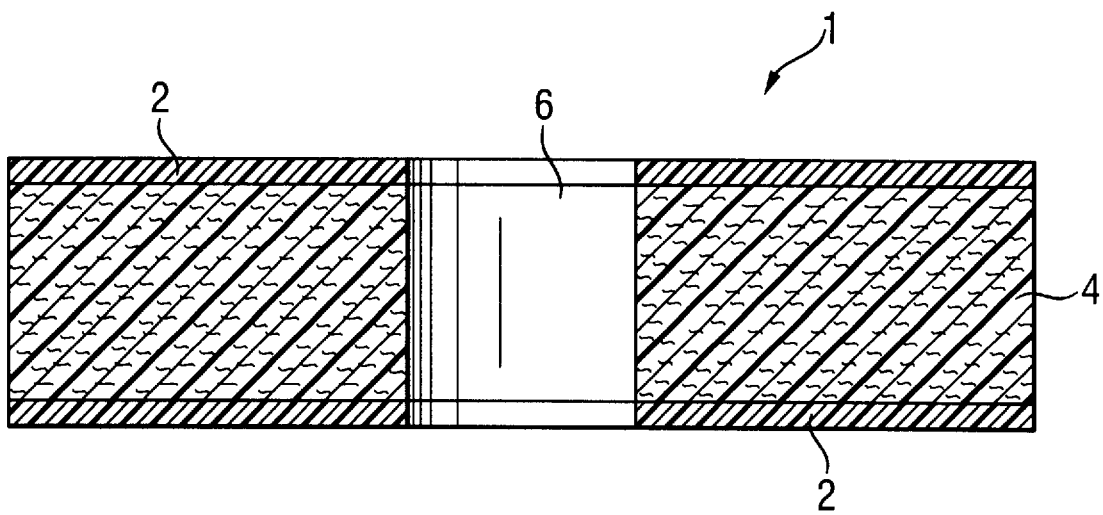
FIG. 1 is a diagrammatic, cross-sectional view, which is not to scale, of a flat gasket made from a flat semi-finished product according to the invention.

Referring now to the figures of the drawings in detail and first, particularly, to FIG. 1 thereof, there is seen a cross-sectional illustration of an annular flat gasket 1 for sealing an otherwise non-illustrated flange connection. The flat gasket 1 is made, and preferably punched, from a flat semi-finished product according to the invention and includes a sheet 4 that is provided on each side with a thin coating 2.

The sheet 4 is formed essentially of a matrix material reinforced with fillers. The fillers optionally include one or more of the following inert inorganic substances, which may be introduced either in granular or fibrous form: aluminum oxide ($Al_2O_3$), silicon dioxide ($SiO_2$), silicon carbide (SiC) glass, non-graphitized or graphitized carbon or only lamellar mica, with the filler content preferably amounting to more than 25 weight %. The matrix material of the sheet 4 preferably includes fully fluorinated fluoroplastics which are selected from the group polytetrafluoroethylene (PTFE), modified polytetrafluoroethylene (TFM), tetrafluoroethylene/hexafluoropropylene copolymer (FEP) or perfluoroalkoxy copolymer (PFA). It is generally the case that the greater the hardness of the sheet 4, the higher the filler content. According to the invention, the filler content of the sheet 4 is such that, when combined with the sintering process, the plastics sheet has a Shore-D hardness of at least 65. According to the preferred embodiment, the Shore-D hardness of the sheet 4 preferably amounts to at least 68, in particular to at least 70.

The thin coating 2 of the sheet 4 has the task of sealing any leakage channels in a flange connection which are caused, for example, by surface defects such as scratches, furrows or surface roughness due to elastic and/or plastic deformation at the sealing surfaces of the configuration. The coating 2 preferably includes an aqueous fluoroplastics dispersion which, for example, contains polytetrafluoroethylene (PTFE), modified polytetrafluoroethylene (TFM), tetrafluoroethylene/hexafluoropropylene copolymer (FEP) or perfluoroalkoxy copolymer (PFA). In order to provide the gasket 1 with the highest possible compression stability, according to the invention the average layer thickness thereof amounts to more than 0 μm and at most 20 μm and, according to the preferred embodiment, at most 15 μm. Particularly good compression stability combined with a high level of impermeability could be achieved, for example, by average layer thicknesses within a range of from 2 μm to 8 μm.

Table 1 shows characteristic parameters of the production processes together with material properties of 7 examples of flat gaskets. Comparison criteria which are crucial to use in sealing connections (Shore-D hardness of the sheet according to DIN 53505, thermal set value determined according to DIN 28090-2 at T=150° C. and 20 MPa surface pressure (DIN 28091-3) and leakage measured according to DIN 28090-1 at 20 MPa surface pressure and $40 \cdot 10^5$ Pa internal nitrogen pressure) are also given in addition to the composition of the respective flat gasket 1, the thickness of the coating 2, the sintering period and sintering atmosphere. A flat gasket of the prior art described below (Example 1) serves as a reference standard.

EXAMPLE 1

Glass Fiber-Reinforced Flat PTFE Gasket with 25% Glass Fiber Content and Without Coating 75 parts of PTFE (polytetrafluoroethylene) powder (TFM 1700) made by Dyneon, Burgkirchen, Germany, were mixed homogeneously with 25 parts of de-sized glass fibers (MF 7904) made by Bayer, Leverkusen, Germany, in a laboratory mixer made by Eirich (Type R02). The powder composition was then introduced into a steel hollow cylinder mould with an internal diameter $\emptyset_{internal}$=60 mm and an external diameter $\emptyset_{external}$=120 mm and slowly cold-pressed in a single stroke up to a specific surface pressure of 35 MPa. After demolding, the pressed article was sintered in air in a forced-air oven, in which it was held at a final sintering temperature of 375° C. for approximately 4 hours after slow heating. After cooling in the oven, the Shore-D hardness of the material was determined on the basis of DIN 53505 at the ends of the PTFE hollow cylinder, with a value of 60 being obtained therefor.

TABLE 1

| Example | Material | Average surface layer thickness in μm | Sintering atmosphere | Sintering period at final sintering temperature | Shore-D hardness, substrate material | Thermal set value in % | Leakage in mg/(ms) |
|---|---|---|---|---|---|---|---|
| 1 | 75 parts TFM 1700<br>25 parts glass fibers | None | air | 4 hrs | 60 | 40 | 0.004 |
| 2 | 60 parts TFM 1700<br>40 parts glass fibers | None | Nitrogen | 20 hrs | 70 | 2 | 0.17 |
| 3 | 60 parts TFM 1700<br>40 parts glass fibers | 50 | Nitrogen | 20 hrs | 70 | 34 | 0.0005 |
| 4 | 58.8 parts TFM 1700<br>39.2 parts glass fibers<br>2 parts coloring pigments | 12 | Nitrogen | 26 hrs | 73 | 10 | 0.0003 |
| 5 | 58.8 parts TFM 1700<br>39.2 parts glass fibers<br>2 parts coloring pigments | 6 | Nitrogen | 26 hrs | 73 | 9 | 0.0002 |
| 6 | 58.8 parts TFM 1700<br>39.2 parts glass fibers<br>2 parts coloring pigments | 3 | Nitrogen | 26 hrs | 73 | 6 | 0.0005 |
| 7 | 58.8 parts TFM 1700<br>39.2 parts glass fibers<br>2 parts coloring pigments | 6 (on the coated surfaces) | Nitrogen | 26 hrs | 73 | 5.5 | 0.005 |

Thereafter, the PTFE hollow cylinder was preheated to approximately 120° C., pressed onto a metal mandrel and shaved or peeled in a shaving machine to yield PTFE webs 2 mm thick. These PTFE webs forming an intermediate product were cut into lengths and flattened in a laminating press. Finally, annular flat gaskets were punched from the webs and the flat gaskets 1 according to DIN 28090-1 which were thus obtained (internal diameter $d_i$=50 mm and external diameter $d_e$=90 mm) were characterized with regard to their leakage behavior. In addition, thermal set values were measured for annular flat gaskets 1 according to DIN 28090-2 (internal diameter $d_i$=55 mm and external diameter $d_e$=75 mm).

In determining leakage behavior, the flat gaskets 1 were loaded, after preconditioning, with 20 MPa surface pressure in a testing press and subjected to an internal nitrogen pressure of $40 \cdot 10^5$ Pa. Through the use of the drip method, the leakage rate was then determined, with a value of 0.004 mg/(ms) being obtained therefor, as is clear from Table 1. Furthermore, the thermal set value, which indicates the percentage deformation of a gasket at a constant surface pressure (20 MPa), was determined for the flat gaskets 1 at 150° C. and after an action period of 16 hours, which is thus a measure of the creep stability of the material. The thermal set value that was obtained is stated in Table 1 and, at 40%, is high in accordance with expectations. A reason for this is the relatively low filler content of 25% (Table 1, column 2).

EXAMPLE 2

Glass Fiber-Reinforced Flat PTFE Gasket with 40% Glass Fiber Content Without Coating Instead of the glass fiber content stated in Example 1, 40 parts by weight of glass fibers were used in this Example rather than 25 parts by weight. Additionally, in contrast to Example 1, the cold-pressed PTFE/glass fiber hollow cylinder was not sintered in air but rather under an inert gas atmosphere (nitrogen). This was achieved by introducing a sintering bell into the forced-air oven. The bell was repeatedly evacuated and purged with nitrogen gas prior to the sintering process. The hollow cylinder was sintered for at least 1.5 hours per cm of wall thickness of the hollow cylinder at the final sintering temperature, in the present case approximately 20 hours at 375° C. After oven cooling, the Shore-D hardness was determined as in Example 1, with a value of 70 being obtained due to the higher glass fiber content and the special sintering process.

The hollow cylinder was then processed further by shaving to yield PTFE webs with a thickness of 2.2 mm. The distinctly rough-surfaced webs were then calendered to a thickness of 2.0 mm. Flat gaskets 1 were punched from this semi-finished product in like manner to Example 1.

Due to the higher glass fiber content and the special sintering process, namely a long sintering period and sintering under inert gas, a greater Shore-D hardness of the substrate material is obtained, which entails a very low thermal set value of only 2%. In contrast, at 0.17 mg/(ms), the nitrogen leakage rate at $40 \cdot 10^5$ internal pressure and 20 MPa surface pressure assumed a relatively high value, because the conformability of the uncoated sealing surfaces is limited as a result of the high material hardness.

EXAMPLE 3

Glass Fiber-Reinforced Flat PTFE Gasket with 40% Glass Fiber Content and 50 μm Thick PTFE Film Welded to Both Sides The intermediate product from Example 2 (Shore-D hardness=70) was taken after the shaving process. A 50 μm thick sliced film being formed of modified polytetrafluoroethylene (TFM 1700) was welded areally in air onto the two rough surfaces of the intermediate product, so that a hard sheet 4 was obtained with a soft coating on each side. The welding parameters were 375° C., 2 MPa surface pressure and approximately 10 min pressing time. Flat gaskets were again punched out of the coated sheet and the leakage rate and thermal set value were measured as in the previous examples.

Due to the soft PTFE coating 2 and the consequently good ability to seal leakage channels, it was possible to obtain a substantially lower leakage rate of only 0.0005 mg/(ms) than in Example 2 (see Table 1). However, the coating, which was on average 50 μm thick, increased the thermal set value considerably, namely to 34%. As was explained on page 3, the reason for this is that, over and above the known set processes, the relatively thick coating acts as a lubricating film, which causes the gasket to slide to an unexpectedly high degree relative to the flange surface.

EXAMPLES 4, 5 and 6

Glass Fiber-Reinforced Flat PTFE Gaskets with 40% Glass Fiber Content and PTFE Dispersion Coating Applied to Both Sides with an Average Layer Thickness of 3 µm (Example 6), 6 µm (Example 5) and 12 µm (Example 4)

Figure 2:
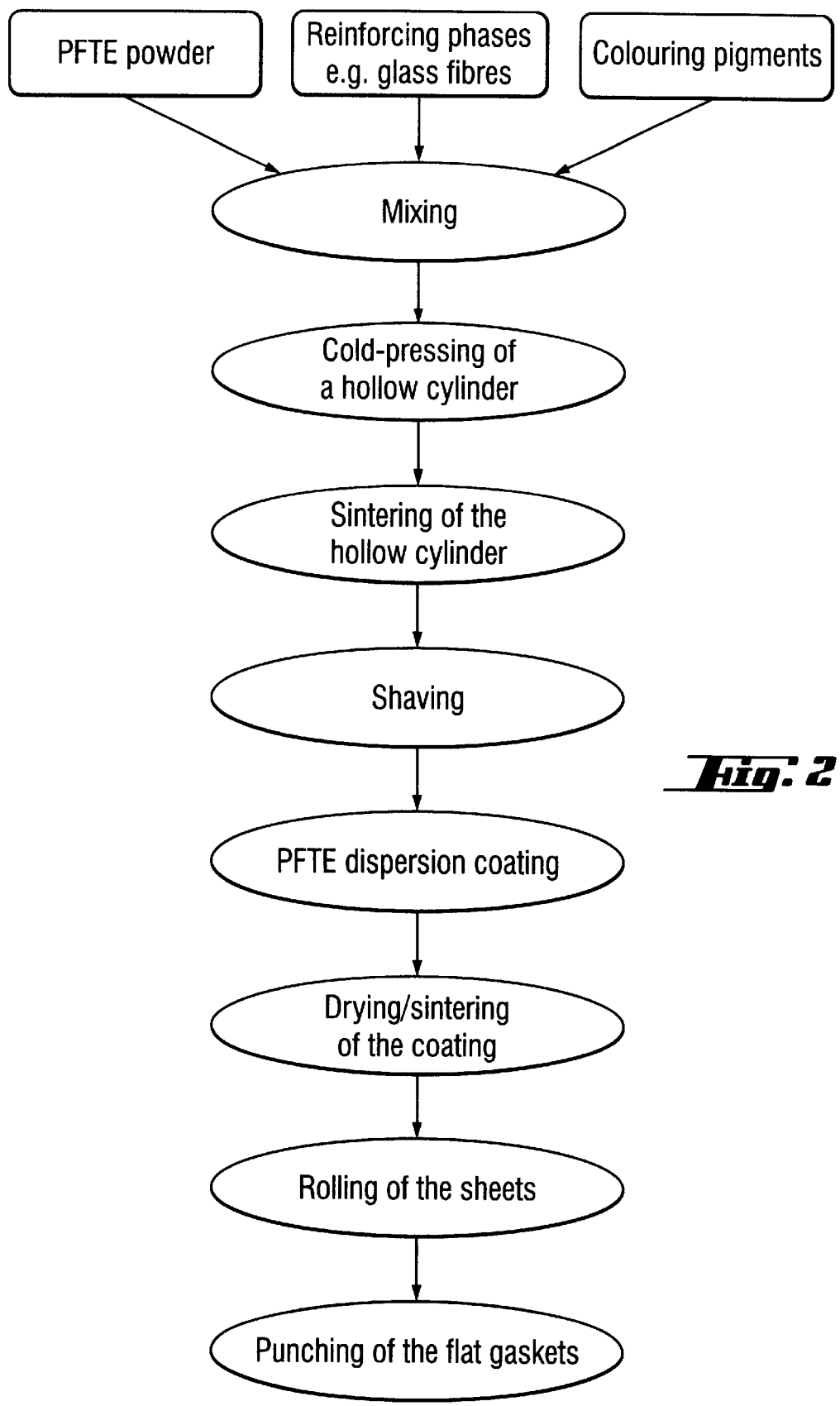
FIG. 2 is a flow chart of a process for producing the flat gasket of FIG. 1.

The flat gaskets 1 described below and the production processes therefor constitute preferred embodiments according to the invention, with the production stages being summarized in the flow chart according to FIG. 2.

To start with, 58.8 parts (weight %) of PTFE powder were mixed with 39.2 parts (weight %) of glass fibers. In addition, 2 parts (weight %) of coloring pigments made by Ferro were added to the compounding/mixing process to color the flat gasket. In contrast to Example 2, the sintering period at the final sintering temperature was extended from 20 hours to 26 hours under oxygen exclusion. Prior to shaving of the sintered hollow cylinder, the Shore-D hardness was again determined at the ends of the sintered hollow cylinder, with a value of 73 being obtained.

After shaving to a thickness of 2.2 mm, the hard PTFE web was cut into sheet lengths and flattened in a laminating press. A PTFE dispersion was then applied by screen printing all over both surfaces of a sheet 4 that were produced in this way. Alternatively, the PTFE dispersion could have been applied by processes such as dipping, spraying, knife application, atomizing or other printing processes.

88.5% of the coating mixture was formed of an aqueous PTFE dispersion (E15264) made by Dyneon, while 10% was formed of a defoaming agent (Fumexol, from Ciba) and 1.5% of a thickener (Viscalex VG, from Ciba). The coatings 2 were applied with three different screens. The screens were formed of a polyester fabric made of polyester monofilaments 48 µm in diameter (reference letter T). The number of monofilaments in the warp and weft directions amounted to 48 (Example 4), 90 (Example 5) and 120 (Example 6), filaments per centimeter. These screens are designated below as 48T, 90T and 120T. It may be noted that, as the filament density decreased, an increasing quantity of dispersion was applied to the hard PTFE sheet 4.

After the subsequent drying and/or sintering treatment, during which the processing aids were removed thermally, the coated sheets 4 were weighed and compared with the starting weight before dispersion coating. If the increase in mass of the sheets 4 is correlated with the density of pure PTFE (2.2 g/cm$^3$) and the dimensions of the sheet 4, an average dispersion layer thickness may be determined therefrom.

When the sheet 4 is coated by the screen printing process, it is possible to adjust the desired average layer thickness of the thin polytetrafluoroethylene dispersion coating 2 as a function of the mesh size of the screen used for screen printing. The coating 2 became thicker, with a greater mesh size of the screen. In detail, this led to the following results for Examples 4, 5 and 6:

EXAMPLE 4

A screen with the mesh size 48T produced an average layer thickness of 12 µm.

EXAMPLE 5

A screen with the mesh size 90T produced an average layer thickness of 6 µm.

EXAMPLE 6

A screen with the mesh size 120T produced an average layer thickness of 3 µm.

After the surface coating process, the coated sheets 4 were rolled or calendered from a thickness of approximately 2.2 mm to 2 mm, with the surface being made smoother and the thin, thermally posttreated coating applied from a dispersion being compacted. During calendering of a sheet 4 with such a thin coating 2, the coating 2 may become perforated. However, this is not disadvantageous, since the coating-free surfaces, which are still surrounded by coating material, may then, as has already been described above, mesh with adjacent mating surfaces of flanges, for example. That has a positive effect on the suppression of creep processes.

Optical-microscope examinations of cross sections on one hand confirmed the above-mentioned average layer thicknesses of the coating 2 and additionally showed that, as the average layer thickness decreases, the applied layer does not always have to form a continuous film, in such a way that the sheet surface is only partially coated. In order to determine the thermal set value and leakage behavior, flat gaskets were again punched from the coated PTFE sheets 4 with different average coating thicknesses of 3 µm, 6 µm and 12 µm.

It is clear from a comparison of the thermal set values for Example 3 on one hand and for Examples 4, 5 and 6 on the other hand according to Table 1, that the substantially thinner coating (3 µm to 12 µm) than the 50 µm coating reduced the thermal set value considerably, namely from 34% to only 6% to 10%.

Due to the relatively thin coating (3 µm to 12 µm) in Examples 4, 5 and 6, it was to be expected that the leakage rate would be similar to that of the uncoated, similarly hard flat gasket of Example 2. Surprisingly, however, the leakage rate was approximately three powers of ten times lower than in Example 2.

EXAMPLE 7

Figure 3:
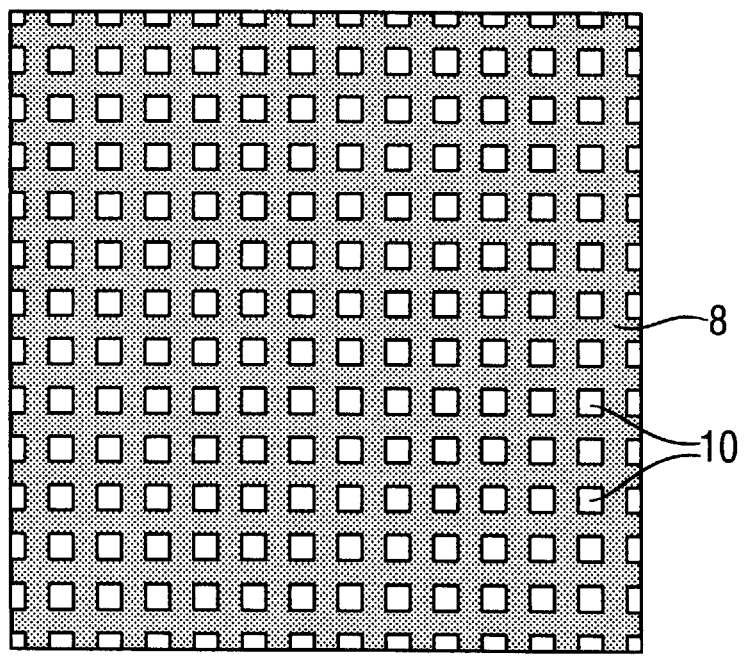
FIG. 3 is a plan view of a dispersion coating with a lattice structure on the semi-finished product or the flat gasket of FIG. 1.

Glass Fiber-Reinforced Flat PTFE Gaskets with 40% Glass Fiber Content and PTFE Dispersion Coating Applied to Both Sides in the Form of a Lattice Pattern The PTFE substrate and the PTFE coating mixture were produced in the same way as described in Examples 4, 5 and 6. However, in contrast to these examples, only one monofilament screen was used, with a filament density of 90 filaments per centimeter (90T). Some of the screen fabric was made impermeable to the PTFE dispersion in accordance with FIG. 3. These impermeable parts of the screen were each square, with a side length of two millimeters. The impermeable squares 10 were each disposed two millimeters apart, in such a way that a regular "lattice" was produced. So-called "lattice lines" 8 thereof are shown in black in FIG. 3 and have a width of 2 millimeters.

With the aid of this screen, the PTFE substrate was then only partially coated with PTFE dispersion as desired, namely along the "lattice lines". With a 90T screen and the dispersion formulation indicated in Examples 4 to 6, a local coating thickness of six micrometers is typically established.

After the surface coating process, the coated sheets 4 were initially thermally post-treated and then (rolled or) calendered from a thickness of approximately 2.2 mm to 2.0 mm. Thus the surface was made smoother and the thin coating applied from a dispersion was compacted. Flat gaskets were then punched out of the semi-finished product which was thus produced.

Upon use as a flat gasket in a sealing connection, a material which is thus coated with the lattice-form coating pattern did not permit any continuous leakage channels, since the uncoated surfaces were fully surrounded by coated surfaces. The uncoated surfaces of the PTFE substrate were able to ensure particularly good meshing with the flange surface pressed against it. This had a positive effect on compression stability, while the lattice-coated surfaces of the PTFE substrate ensured a good seal.

The thermal set value of 5.5% achieved with this material was lower than the thermal set values of the virtually fully, but thinly coated materials of Examples 4 to 6.

Although, at 0.005 mg/(ms), the leakage rate was somewhat higher than the corresponding values for Examples 4 to 6, it was nevertheless two powers of ten better than that of the uncoated material of Example 2, Table 1.

The surface of the sheet 4 is only partially coated in this example. The degree of coating is thus less than 100%. In the case of other dimensions of coated and uncoated surfaces together with other coating patterns, the degree of coating changes. It is preferably between 50% and 100%, if similarly favorable combinations of thermal set value and leakage rate as in this Example 7 are to be achieved.

To summarize, it should be noted that a flat gasket 1 of relatively creep-resistant, hard PTFE sheet with a relatively thin, soft PTFE coating 2 ensures both low thermal set values as well as low leakage rates.

Additional tests on the aforesaid examples showed that the highest possible hardness was always achieved for the core sheet when sintering was performed under air exclusion and when a deliberately long sintering period at the final sintering temperature of more than 1.5 hours per cm of hollow cylinder wall thickness was selected.

The use of the invention is not restricted to flat gaskets 1, but rather other components in which the described advantages such as, for example, a low thermal set value may be of use, may also be produced from the semi-finished product according to the invention.

We claim:

1. A flat semi-finished product, comprising:
   a sheet having a surface, said sheet formed of a fluoroplastics substrate containing fillers, and said substrate having a Shore-D hardness of at least 65; and
   a coating disposed on said sheet, said coating formed of fluoroplastics, said coating being softer and thinner than said sheet, said coating at least partially covering said surface of said sheet, and said coating having an average layer thickness of at most 20 μm.

2. The flat semi-finished product according to claim 1, wherein said fillers in said sheet contain at least one inert inorganic substance in granular or fibrous form, and said fillers are present in an amount greater than 25 weight %.

3. The flat semi-finished product according to claim 2, wherein said fillers in said sheet contain at least one substance selected from the group consisting of aluminum oxide ($Al_2O_3$), silicon dioxide ($SiO_2$), silicon carbide (SiC), glass, carbon in non-graphitized form, carbon in graphitized form and mica.

4. The flat semi-finished product according to claim 1, wherein said sheet has a matrix material formed of a fluorine-containing plastics.

5. The flat semi-finished product according to claim 1, wherein said sheet has a matrix material formed substantially of fully fluorinated plastics selected from the group consisting of polytetrafluoroethylene (PTFE), modified polytetrafluoroethylene (TFM), tetrafluoroethylene/hexafluoropropylene copolymer (FEP) and perfluoroalkoxy copolymer (PFA).

6. The flat semi-finished product according to claim 1, wherein said thin coating on said sheet includes an aqueous fluoroplastics dispersion.

7. The flat semi-finished product according to claim 6, wherein said aqueous flucroplastics dispersion contains a material selected from the group consisting of polytetrafluoroethylene (PTFE), modified polytetrafluoroethylene (TFM), tetrafluoroethylene/hexafluoropropylene copolymer (FEP) and perfluoroalkoxy copolymer (PFA).

8. The flat semi-finished product according to claim 1, wherein said thin coating covers all of said surface of said sheet.

9. The flat semi-finished product according to claim 1, wherein said thin coating is perforated in places and covers only part of said surface of said sheet.

10. The flat semi-finished product according to claim 9, wherein between 50% and substantially 100% of said surface of said sheet is covered by said perforated coating.

11. The flat semi-finished product according to claim 9, wherein said coating has a grid or lattice-shape, and said covered part of said surface of said sheet is in the form of mutually perpendicular lattice lines surrounding uncoated portions of said sheet.

12. The flat semi-finished product according to claim 1, wherein said Shore-D hardness of said substrate material of said sheet is at least 68.

13. The flat semi-finished product according to claim 1, wherein said Shore-D hardness of said substrate material of said sheet is at least 70.

14. The flat semi-finished product according to claim 1, wherein said coating has an average layer thickness of at most 15 μm.

15. The flat semi-finished product according to claim 1, wherein said coating has an average layer thickness within a range of from 2 μm to 8 μm.

16. The flat semi-finished product according to claim 1, wherein said fillers in said sheet contain at least one inert inorganic substance in granular or fibrous form, said fillers being present in a sufficient amount to increase the hardness of said material.

17. A component, comprising a flat semi-finished product, including:
   a sheet having a surface, said sheet formed of a fluoroplastics substrate containing fillers, and said substrate having a Shore-D hardness of at least 65; and
   a coating disposed on said sheet, said coating formed of fluoroplastics, said coating being softer and thinner than said sheet, said coating at least partially covering said surface of said sheet, and said coating having an average layer thickness of at most 20 μm.

18. The component according to claim 17, wherein said flat semi-finished product is punched into a component.

19. A flat gasket, comprising a flat semi-finished product, including:
- a sheet having a surface, said sheet formed of a fluoroplastics substrate containing fillers, and said substrate having a Shore-D hardness of at least 65; and
- a coating disposed on said sheet, said coating formed of fluoroplastics, said coating being softer and thinner than said sheet, said coating at least partially covering said surface of said sheet, and said coating having an average layer thickness of at most 20 µm.

20. The flat gasket according to claim 19, wherein said flat semi-finished product is punched into a flat gasket.

21. A process for producing a flat semi-finished fluoroplastics product, which comprises:
- mixing a polytetrafluoroethylene powder with a reinforcing phase to yield a powder composition;
- cold-pressing the powder composition to yield a hollow cylinder;
- sintering the hollow cylinder under an inert gas atmosphere;
- shaving at least one sheet from the hollow cylinder; and
- applying a polytetrafluoroethylene dispersion to at least one surface of the sheet by a method selected from the group consisting of dipping, spraying, knife application, atomizing, printing and screen printing, to provide the sheet with a thin polytetrafluoroethylene dispersion coating having an average layer thickness of at most 20 µm wherein the sheet has a Shore-D hardness of at least 65 and the coating is softer and thinner than the sheet.

22. The process according to claim 21, which further comprises carrying out the step of sintering the hollow cylinder under a nitrogen atmosphere.

23. The process according to claim 21, which further comprises providing the coating with an average layer thickness of 2 µm to 8 µm.

24. The process according to claim 20, which further comprises applying different printed patterns with different dispersion quantities per unit area to a fluoroplastics substrate of the sheet by screen printing.

25. The process according to claim 21, which further comprises at least one of drying and sintering the sheet after coating with the polytetrafluoroethylene dispersion coating.

26. The process according to claim 25, which further comprises incorporating the polytetrafluoroethylene dispersion coating applied to the sheet into the surface of the sheet by rolling or pressing, after the step of at least one of drying and sintering the sheet.

27. The process according to claim 21, which further comprises carrying out the step of sintering the hollow cylinder during a sintering period of at least 1 hour per cm of wall thickness of the hollow cylinder at a final sintering temperature in a range between 350 and 390° C.

28. The process according to claim 21, which further comprises carrying out the mixing step by using an inorganic, inert substance in granular or fibrous form as the reinforcing phase in an amount of at least 25 weight % relative to the powder composition.

29. The process according to claim 28, which further comprises selecting an inorganic, inert substance from the group consisting of aluminum oxide ($Al_2O_3$), silicon dioxide ($SiO_2$), silicon carbide (SiC), glass, non-graphitized carbon, graphitized carbon and mica, as the reinforcing phase.

30. The process according to claim 21, which further comprises producing at least one flat gasket from the coated sheet.

31. The process according to claim 21, which further comprises producing at least one annular gasket from the coated sheet.

32. The process according to claim 21, which further comprises punching at least one flat gasket from the coated sheet.

33. The process according to claim 21, which further comprises punching at least one annular gasket from the coated sheet.

* * * * *